United States Patent [19]

Bratt et al.

[11] 4,455,603

[45] Jun. 19, 1984

[54] SYSTEM FOR RESOLVING POINTERS IN A DIGITAL DATA PROCESSING SYSTEM

[75] Inventors: Richard G. Bratt, Wayland, Mass.; Lawrence H. Katz, Oregon City, Oreg.; Douglas M. Wells, Chapel Hill, N.C.

[73] Assignee: Data General Corporation, Westboro, Mass.

[21] Appl. No.: 266,416

[22] Filed: May 22, 1981

[51] Int. Cl.³ .............................................. G06F 9/22
[52] U.S. Cl. .................................................. 364/200
[58] Field of Search ... 364/200 MS File, 900 MS File; 371/16

[56] References Cited

U.S. PATENT DOCUMENTS 3,916,178 10/1975 Greenwald .......................... 371/16
4,315,311 2/1982 Causse et al. ...................... 364/200
4,321,666 3/1982 Tasar et al. ......................... 364/200

Primary Examiner—Charles E. Atkinson
Attorney, Agent, or Firm—Gordon E. Nelson; Joel Wall; Jacob Frank

[57] ABSTRACT

Systems and method for resolving unresolved pointers in digital computer systems. In unresolved pointers, addresses are represented by means of data items from which the addresses may be derived. The unresolved pointer is resolved when the represented address is derived from the data items. One such system includes the unresolved pointers and procedures for resolving the unresolved pointers in the digital computer system's memory and apparatus in the digital computer system's process which operates under control of pointer translation microcode to translate pointers into represented addresses and under control of call-return microcode for invoking procedures from microcode. The pointer translation microcode responds to an unresolved pointer by causing the call-return microcode to invoke the procedures for resolving the unresolved pointer. Using the data items in the unresolved pointer, the procedures derive the represented address and return it to the pointer translation microcode. Another such system includes an associated address table which associates an unresolved pointer with its represented address and associated pointer fault procedures. Here, the pointer translation microcode responds to the unresolved pointer by searching the table for an entry containing the unresolved pointer. If there is such an entry, the pointer translation microcode obtains the represented address from the table. If there is not, the pointer translation microcode causes the call-return microcode to invoke the associated pointer fault procedures, which resolve the unresolved pointer and place the represented address in the associated address table. A third such system combines the first two systems. Details of the systems and methods of resolving unresolved pointers are also disclosed.

14 Claims, 2 Drawing Figures

POINTER FORMATS

SYSTEM FOR RESOLVING POINTERS IN A DIGITAL DATA PROCESSING SYSTEM

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system háving the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modifications have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates to pointers in a digital computer system. Pointers are data items which represent addresses. In the present invention, the pointers include unresolved pointers which do not contain or otherwise directly represent addresses, but do contain data from which the addresses represented by the pointers may be derived. The operation of obtaining the address represented by the unresolved pointer using the data in the pointer is termed resolving the pointer.

The present invention concerns systems for resolving unresolved pointers. A first such system includes unresolved pointers in the computer's memory, pointer resolution procedures for deriving the address represented by a given unresolved pointer from the data contained in the unresolved pointer, and hardware in the processor operating under control of pointer translation microcode which translates pointers into the addresses they represent and under control of call-return microcode which invokes procedures from microcode and returns to microcode.

In operation, the pointer translation microcode receives an unresolved pointer, the pointer translation microcode causes the call microcode to invoke the pointer resolution procedures and pass the unresolved pointer to them, and the pointer resolution procedures use the data contained in the unresolved pointer to derive the address represented by the unresolved pointer. The pointer resolution procedures then return the represented address to the call microcode, which returns it to the pointer translation microcode.

A second such system includes the pointer translation microcode and hardware, an associated address table in memory, and an associated address fault instruction sequence. Each entry in the associated address table associates an unresolved pointer with the address represented by the unresolved pointer. When the pointer translation microcode receives an unresolved pointer, it searches the associated address table for an entry containing the unresolved pointer. If it finds such an entry, that entry contains the address represented by the pointer. If there is no entry for the unresolved pointer, the pointer translation microcode causes the microcode to software call microcode to invoke the associated pointer fault procedure, which resolves the unresolved pointer and constructs an entry in the associated address table.

The invention further includes a third system which combines the first two systems, certain details of the systems, and methods of resolving pointers.

It is thus an object of the invention to provide an improved digital data processing system.

It is a further object of the invention to provide systems in a digital data processing system capable of resolving unresolved pointers.

It is yet another object of the invention to provide systems for resolving unresolved pointers which are capable of resolving many different types of unresolved pointers.

It is a still further object of the invention to provide systems for efficiently resolving unresolved pointers.

It is still another object of the invention to provide methods for resolving unresolved pointers.

Other objects, advantages and features of the present invention will be understood by those of ordinary skill in the art, after referring to the following detailed description of the preferred embodiments and drawings wherein:

DESCRIPTION OF THE PREFERRED EMBODIMENTS

Figure 301:
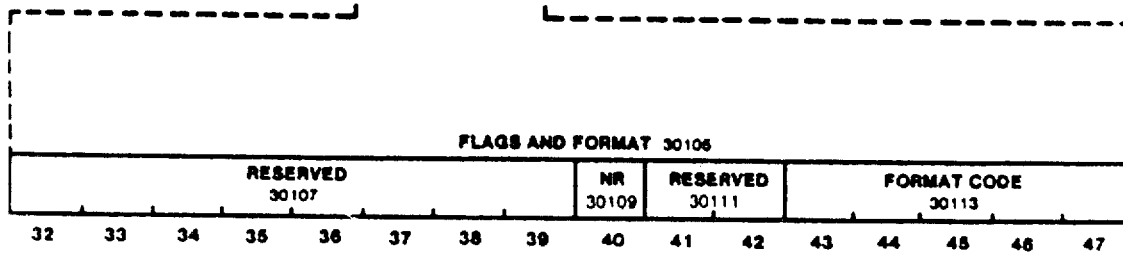
FIG. 301 is a diagram illustrating the pointer formats of the present invention.
Figure 302:
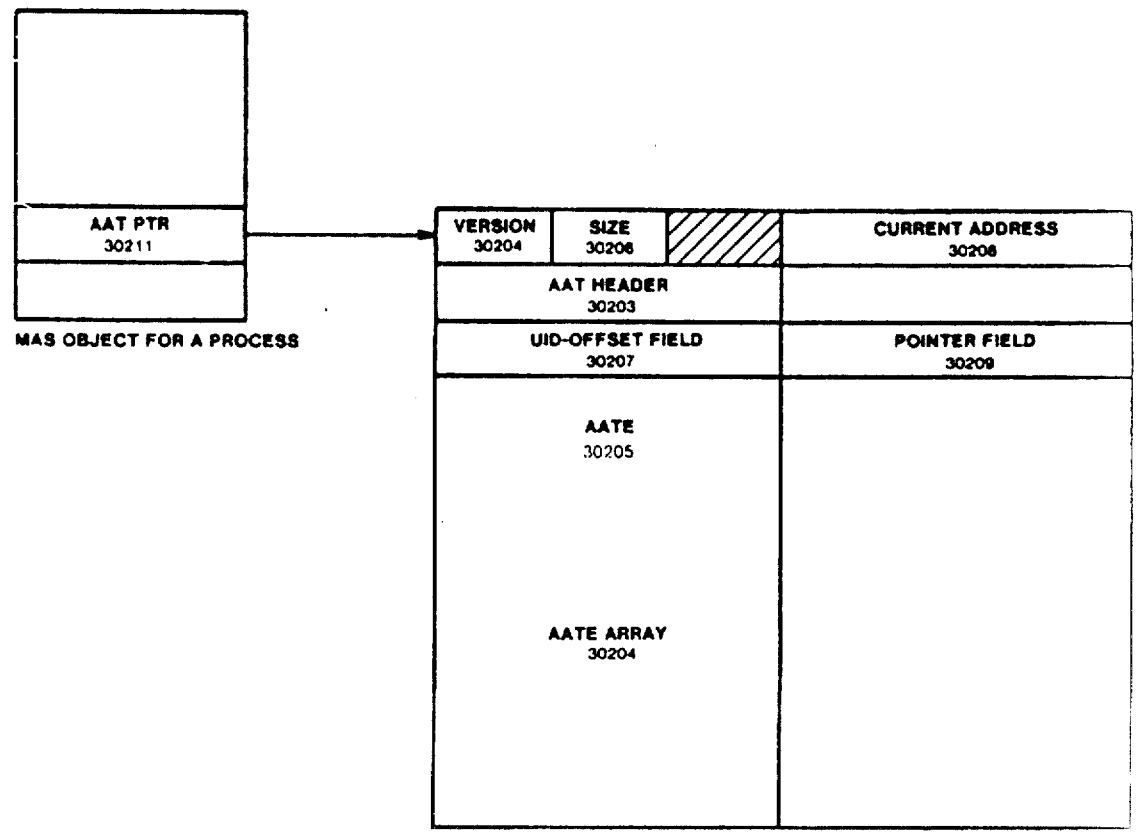
FIG. 302 is a diagram illustrating the associated address table of the present invention.

The preferred embodiments of the present invention are disclosed in Ward Baxter II, et al., Digital Data Processing System having an I/0 Means using Unique Address-Providing and Access Priority Control Techniques, U.S. patent application Ser. No. 266,402, filed May 22, 1981. That application, which is owned by the same assignee as the present application, is hereby incorporated by reference into the present application. Particular attention is directed to Chaper 3(A) of that application and to the Figures referred to there.

What is claimed is:

1. In a digital computer system including memory means for storing and providing data items in response to memory commands, each said memory command including an address specifying a location in said memory means, and processor means connected to said memory means for providing said memory commands and providing and receiving said data items in response to instructions of said data items executed by said processor means while performing an execution of a sequence of said instructions, and wherein said data items further include pointers representing represented addresses of said addresses, said pointers including unresolved pointers containing said data items from which said represented addresses may be derived, means for resolving said pointers into said represented addresses comprising:

(1) ordinary unresolved pointers of said unresolved pointers;

(2) a pointer resolution sequence of said sequences for receiving any said ordinary unresolved pointer, deriving said represented address using said contained data items, and returning said represented address;

(3) pointer translation means in said processor means responsive to said pointers for translating each said pointer into said represented address; and (4) call-return operation execution means in said processor means responsive to operation of said processor means for commencing said execution of any said sequence and terminating said execution, said call-return operation execution means responding to operation of said pointer translation means when said pointer translation means receives any said ordinary unresolved pointer by providing said received ordinary unresolved pointer to said pointer resolution sequence, causing said processor means to execute said pointer resolution sequence, and providing said represented address returned by said pointer resolution sequence to said pointer translation means.

2. In the pointer resolution means of claim 1, and wherein:

certain said contained data items in said ordinary unresolved pointer are defined by a user of said digital computer system;

a certain said sequence is provided by said user for deriving said represented address from said user-defined contained data item; and said call-return operation execution means invokes said certain sequence when said ordinary unresolved pointer contains said user-defined contained data items.

3. In the pointer resolution means of claim 1, and wherein:

said unresolved pointers further include associative said unresolved pointers;

said execution of any said sequence by said processor means is associated with an associated address table of said data items accessible to said pointer translation means during execution of said any sequence for associating said associative unresolved pointers received during said execution of said any sequence with said represented addresses represented by said received associative unresolved pointers; and said pointer translation means responds to each of said received associative unresolved pointers by employing said associated address table to obtain said represented address represented by said received associative unresolved pointer.

4. In the pointer resolution means of claim 3, and wherein:

said associated address table includes a plurality of associated address table entries, each valid one of said plurality of associated address table entries containing one said associative unresolved pointer and first certain of said valid associated address table entries further containing said represented address represented by said one associative unresolved pointer and second certain ones of said valid associated address table entries further containing one said unresolved pointer representing said represented address represented by said one associative unresolved pointer; and said pointer translation means obtains said represented address by locating said valid associated address table entry whose said one associative unresolved pointer is the same as said received associative unresolved pointer, and if said located valid associated address table entry is one of said first certain ones, using said represented address from said located valid associated address table as said represented address represented by said received associative unresolved pointer, but if said located valid associated address table entry is one of said second certain ones, translating said one unresolved pointer into said represented address represented by said one unresolved pointer and using said represented address represented by said one unresolved pointer as said represented address represented by said received associative pointer.

5. In the pointer resolution means of claim 3, and wherein:

said memory means is organized into objects identified by object identifiers;

said addresses include object identifier addresses containing said object identifiers and internal addresses used internally to said processor means;

said represented addresses are said object identifier addresses;

said pointers further include resolved pointers, each one of said resolved pointers directly representing one said object identifier address; and said pointer translation means further translates said represented addresses into said internal addresses.

6. In a digital computer system including memory means for storing and providing data items in response to memory commands, each said memory command including an address specifying a location in said memory means, and processor means connected to said memory means for providing said memory commands and providing and receiving said data items in response to instructions of said data items executed by said processor means while performing an execution of a sequence of said instructions, and wherein said data items further include pointers representing represented addresses of said addresses, said pointers including unresolved pointers containing said data items from which said represented addresses may be derived, pointer resolution means comprising:

(1) associative unresolved pointers of said unresolved pointers;

(2) an associated address table associated with each said execution of any said sequence for associating said associative unresolved pointers received during said execution of said any sequence with said represented addresses represented by said received associative unresolved pointers; and (3) pointer translation means responsive to each of said received associative unresolved pointers for employing said associated address table to obtain said represented address represented by said received associative unresolved pointer.

7. In the pointer resolution means of claim 6, and wherein: ;

said sequences further include an associated pointer fault sequence for receiving any said associative unresolved pointer, deriving said represented address for said received associative unresolved pointer, and associating said represented address and said received associative unresolved pointer; and said call-return operation execution means further responds to said pointer translation means where said associated address table has not associated said received associative unresolved pointer with said represented pointer by providing said received associative unresolved pointer to said associated pointer fault sequence.

8. In the pointer resolution means of claim 6, and wherein:

said memory means is organized into objects and each said data item belongs to one said object;

each said object belongs to a domain of a plurality of domains;

each said sequence is associated with one said domain;

said memory means provides any said data item to said processor means and receives said any data item from said processor means only if said object to which said data item belongs belongs to said domain associated with said sequence currently being executed by said processor means; and said associated address table associated with said execution of any said sequence belongs to a certain said object belonging to said domain associated with said any sequence.

9. In the pointer resolution means of claim 6, and wherein:

said associated address table includes a plurality of associated address table entries, each said associated address table entry associating one said associative unresolved pointer with said represented address represented by said one associative unresolved pointer;

said associated address table entries are organized into hash chains corresponding to hash values produced by hashing said associative unresolved pointers; and said pointer translation means hashes said received associative unresolved pointer to produce said hash value corresponding to said received associative unresolved pointer, locates said hash chain corresponding to said procuded hash value, and locates said associative address table entry in said hash chain containing said received associative unresolved pointer.

10. In a digital computer system including
   memory means for storing and providing data items in response to memory commands, each said memory command including an address specifying a location in said memory means, and
   processor means connected to said memory means for providing said memory commands and providing and receiving said data items in response to sequences of instructions of said data items executed by said processor means, and wherein
   said data items include ordinary unresolved pointers, each one of said ordinary unresolved pointers representing a represented address of said addresses and containing said data items from which said represented address may be derived and
   said processor includes call-return operation execution means responsive to operation of said processor means for causing said processor means to commence and terminate an execution of any said sequence,
   the method of resolving said ordinary unresolved pointers into said represented addresses comprising the steps of:
   (1) receiving any said ordinary unresolved pointer in said processor means;
   (2) providing said received ordinary unresolved pointer to said call-return operation execution means;
   (3) causing said call-return operation execution means to commence execution of a pointer resolution sequence of said sequences, said pointer resolution sequence serving to derive said represented address for said received ordinary unresolved pointer using said contained data items in said received ordinary unresolved pointer and to return said represented address; and
   (4) receiving said represented address from said call-return operation execution means.

11. In a digital computer system including
   memory means for storing and providing data items in response to memory commands, each said memory command including an address specifying a location in said memory means, and
   processor means connected to said memory means for providing said memory commands and providing and receiving said data items in response to sequences of instructions of said data items executed by said processor means, and wherein
   said data items include associative unresolved pointers, each one of said associative unresolved pointers representing a represented address of said addresses and containing said data items from which said represented address may be derived,
   the method of resolving said associative unresolved pointers into said represented addresses comprising the steps of:
   (1) receiving any of said associative unresolved pointers in said processor means;
   (2) using said received associative unresolved pointer to locate an entry in an associative address table of said data items associating said received associative unresolved pointer with said represented address represented by said received associative unresolved pointer; and
   (3) obtaining said represented address from said associative address table entry for said received associative unresolved pointer.

12. In the method of claim 11, and wherein:
   said processor includes call-return operation execution means responsive to operation of said processor means for causing said processor means to commence and terminate an execution of any said sequence; and
   when said associative address table contains no said associative address table entry corresponding to said received associative unresolved pointer, said step (2) further comprises the steps of
   (a) providing said received associative unresolved pointer to said call-return execution means; and
   (b) causing said call-return execution means to execute an associative pointer fault sequence of said sequences for receiving said received associative unresolved pointer, deriving said represented address using said contained data items in said received associative unresolved pointer, and creating said associated address table entry for said received associative unresolved pointer and said represented address.

13. In a digital computer system including
   memory means for storing and providing data items in response to memory commands, each said memory command including an address specifying a location in said memory means, and
   processor means connected to said memory means for providing said memory commands and providing and receiving said data items in response to sequences of instructions of said data items executed by said processor means, and wherein
   said data items include unresolved pointers, each one of said unresolved pointers representing a represented address of said addresses and including said data items from which said represented address may be derived and said unresolved pointers include ordinary unresolved pointers and associative unresolved pointers, and
   said processor means includes call-return operation execution means responsive to operation of said processor means for causing said processor means to commence and terminate an execution of any said sequence,
   the method of resolving said unresolved pointers comprising the steps of:
   (1) receiving any said unresolved pointer in said processor means;
   (2) determining whether said received unresolved pointer is one of said ordinary unresolved pointers or one of said associative unresolved pointers and
   if said received unresolved pointer is one of said ordinary unresolved pointers, performing the steps of
      (a) providing said received unresolved pointer to said call-return operation execution means, and
      (b) causing said call-return operation execution means to commence execution of a pointer resolution sequence of said sequences, said pointer resolution sequence serving to derive said represented address using said contained data items in said received unresolved pointer and return said represented address, and
   if said received unresolved pointer is one of said associative unresolved pointers, (c) using said received unresolved pointer to locate an entry in an associative address table of said data items associating said received unresolved pointer with said represented address represented by said received unresolved pointer and (d) obtaining said represented address associated with said received unresolved pointer in said located entry.

14. In the method of claim 13, and wherein:

said associated address table entries include first certain said associated address table entries containing one said associative unresolved pointer and said represented address represented by said one associative unresolved pointer and second certain said associated address table entries containing one said associative unresolved pointer and one said unresolved pointer representing said represented address represented by said one associative pointer; and said step (d) includes the step of repeating said step (1) and said step (2) using said one unresolved pointer when said located entry is one of said second certain associated address table entries and the step of obtaining said represented address when said located entry is one of said second certain entries.

* * * * *